United States Patent [19]
Duncan et al.

[11] Patent Number: 6,163,844
[45] Date of Patent: Dec. 19, 2000

[54] METHOD FOR GRANTING ACCESSES TO INFORMATION IN A DISTRIBUTED COMPUTER SYSTEM

[75] Inventors: Alex Duncan; Stephan Farrell; Cedric Scott, all of Dublin, Ireland

[73] Assignee: Software and Systems Engineering Limited, Dublin, Ireland

[21] Appl. No.: 09/036,139

[22] Filed: Mar. 6, 1998

[30] Foreign Application Priority Data

Mar. 6, 1997 [EP] European Pat. Off. .............. 97103790

[51] Int. Cl.⁷ .................................................. G06F 15/00
[52] U.S. Cl. .............................. 713/201; 709/230; 714/49
[58] Field of Search ..................................... 713/200, 201, 713/202; 707/9; 710/129; 709/227, 223, 230, 236, 237, 238; 380/4, 5, 25, 29; 714/49

[56] References Cited

U.S. PATENT DOCUMENTS

| | | | |
|---|---|---|---|
| 4,531,023 | 7/1985 | Levine . | |
| 5,113,499 | 5/1992 | Ankney et al. | 395/325 |
| 5,577,209 | 11/1996 | Boyle et al. | 709/200 |
| 5,757,924 | 5/1998 | Friedman et al. | 380/49 |
| 5,790,546 | 8/1998 | Dobbins et al. | 370/400 |
| 5,826,029 | 10/1998 | Gore, Jr. et al. | 709/227 |
| 5,850,449 | 12/1998 | McManis | 380/25 |
| 5,898,830 | 4/1999 | Wesinger, Jr. et al. | 713/201 |
| 5,907,602 | 5/1999 | Peel et al. | 379/114 |
| 5,940,591 | 8/1999 | Boyle et al. | 713/200 |
| 6,006,228 | 12/1999 | McCollum et al. | 707/9 |
| 6,009,247 | 12/1999 | Canora et al. | 710/129 |

FOREIGN PATENT DOCUMENTS 0 362 105   4/1990   European Pat. Off. .

OTHER PUBLICATIONS

"The ECMA GSS–API Mechanism", ECMA Standardizing Information and Communication Systems, Standard ECMA–235, Mar. 1996.
"The SSL Protocol Version 3.0", Internet Draft, Mar. 1996.
Berners–Lee, et al., Informational, May 1996.
Internet Request for Comments: 1508.
Perret, "Mobile assistant programming for efficient information access on the WWW", Computer Networks and ISDN Systems 28 (1996), pp. 1373–1383.
K. Kamiya et al., "Grassroots: A system providing a uniform framework for communicating, structuring, sharing information, and organizing people", Computer Networks and ISDN Systems 28 (1996), pp. 1157–1174.
Kahan, "A capability–based authorization model for the World–Wide Web", Computer Networks and ISDN Systems 27 (1995), pp. 1055–1064.
Lewontin, "The DCE Web toolkit: enhancing WWW protocols with lower–layer services", Computer Networks and ISDN Systems 27 (1995), pp. 765–771.

*Primary Examiner*—Dennis M. Butler
*Assistant Examiner*—Mai Rijue
*Attorney, Agent, or Firm*—Schiff Hardin & Waite

[57] ABSTRACT

In order to avoid undesired access to a data packet in a distributed computer system (10, 13), a class that indicates the degree of freedom of access is allocated to the data packet within the framework of an access control list (ACL). The data packet (10, 13) is additionally allocated to specific privileges that a data processing device (30) must satisfy in order to obtain access to the data packet (10, 13). These privileges can be deposited at the data processing device (31, 41) that has the data packet (10, 13) available to it. A request of a data packet (10, 13) can ensue in a protected fashion within the framework of a security procedure.

14 Claims, 8 Drawing Sheets

| Document Specification | Class | Privileges Required | Instructions |
|---|---|---|---|
| http://*/bin/admin | Hidden | Role: admin Grade: IV | Program: adminp |
| http://*/bin | Entry | Role: cust Role: admin | |
| http://internal/users/* | Hidden | ANY | AddOn: AccessId |
| http://internal/* | Hidden | Role: cust Role: admin | AddOn: Role |
| ftp://*/admin/* | Hidden | Role: admin | |
| ftp://* | Hidden | Role: cust Role: admin | |

← ACL

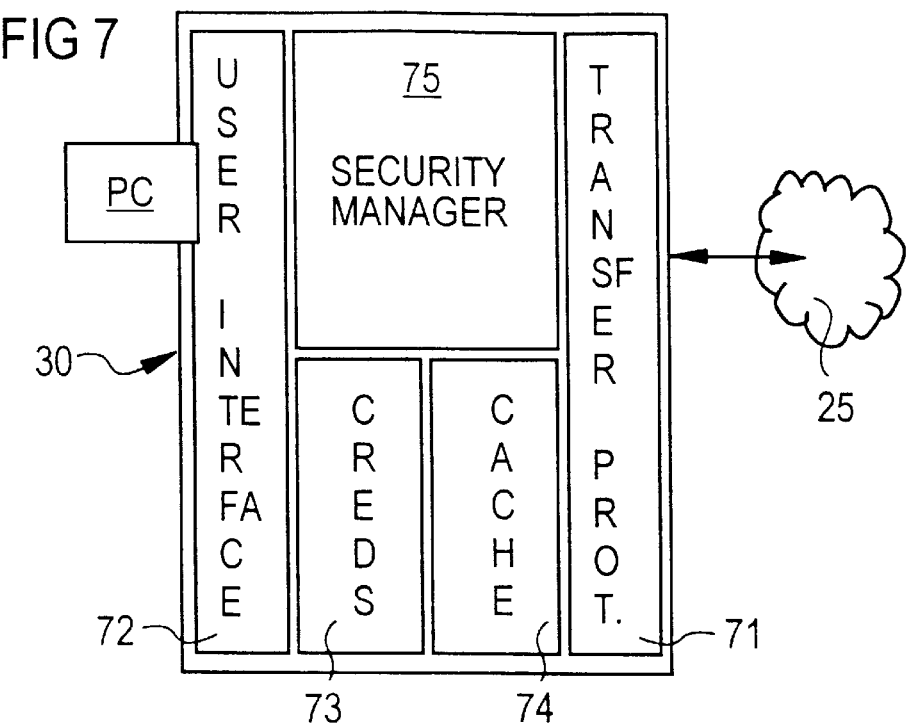
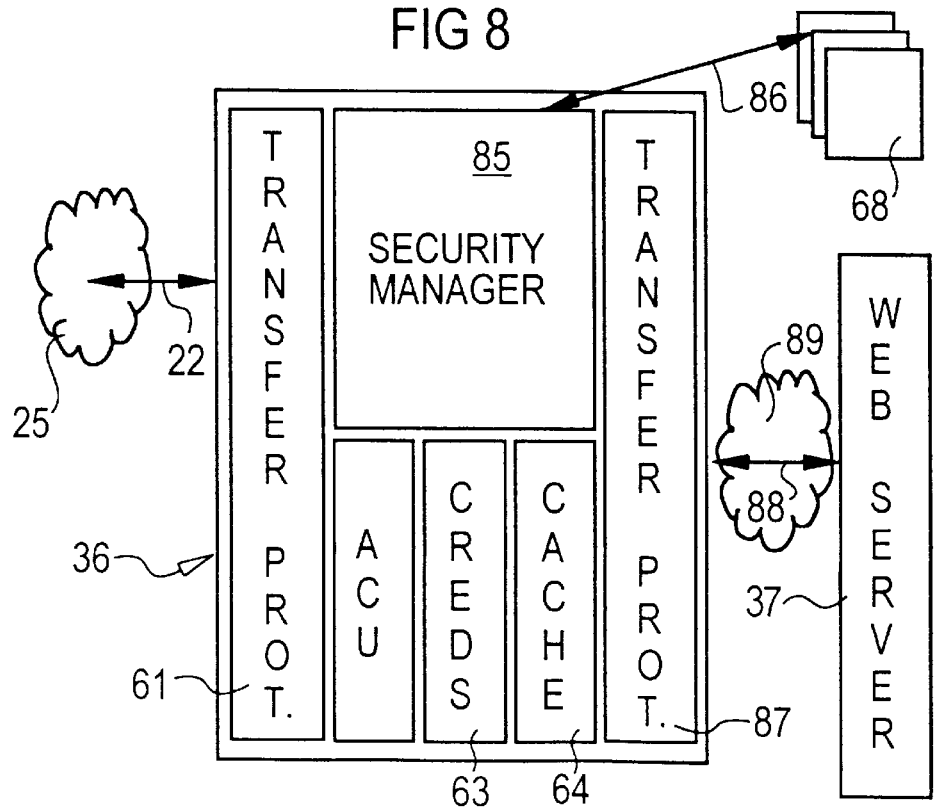

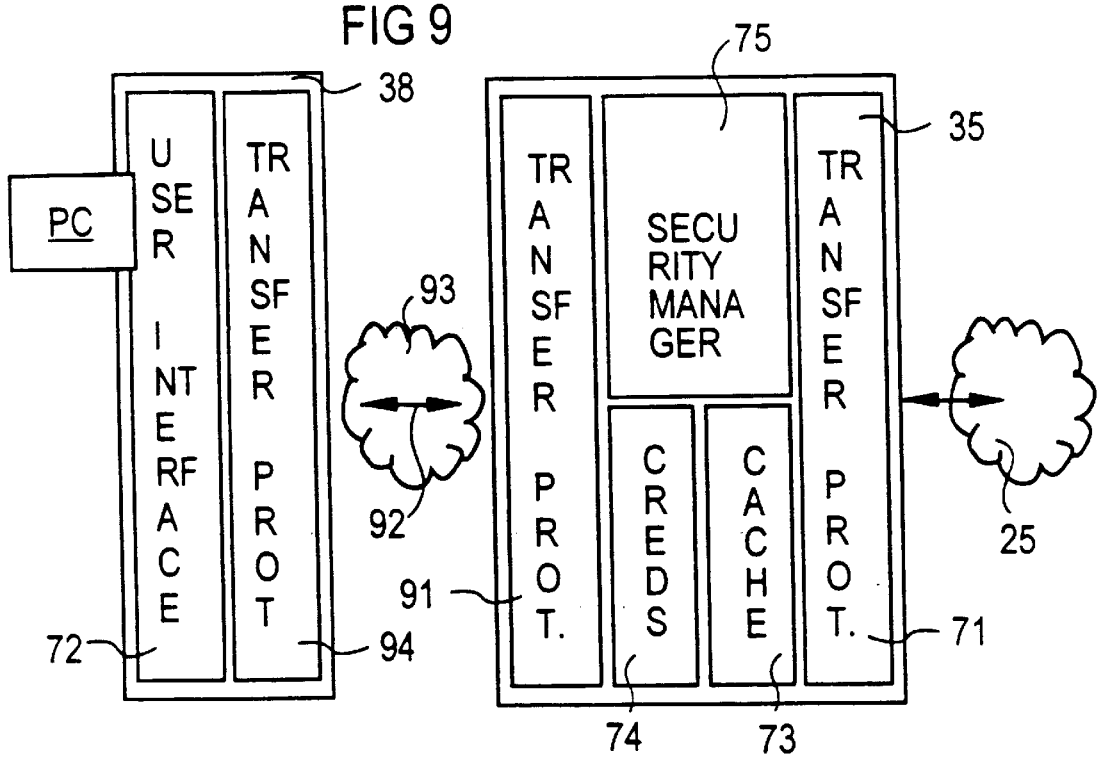
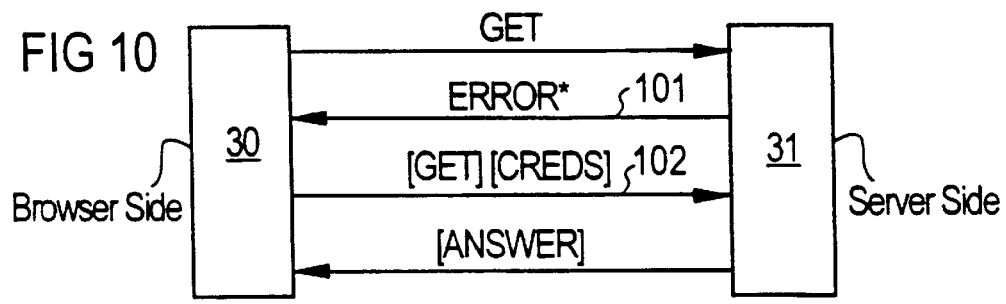
| | PROTOCOL | DOMAIN | PORT | PATH |
|---|---|---|---|---|
| URL | http:// | host.sse.ie | | /documents/doc1 |
| DNS | | host.sse.ie | | |
| SESAME Domain | | SSE.IE | | |
| principal name | websec. | host.sse.ie | | |
| Full principal name | websec. | host.sse.ie | | /SSE.IE@SSE.IE |

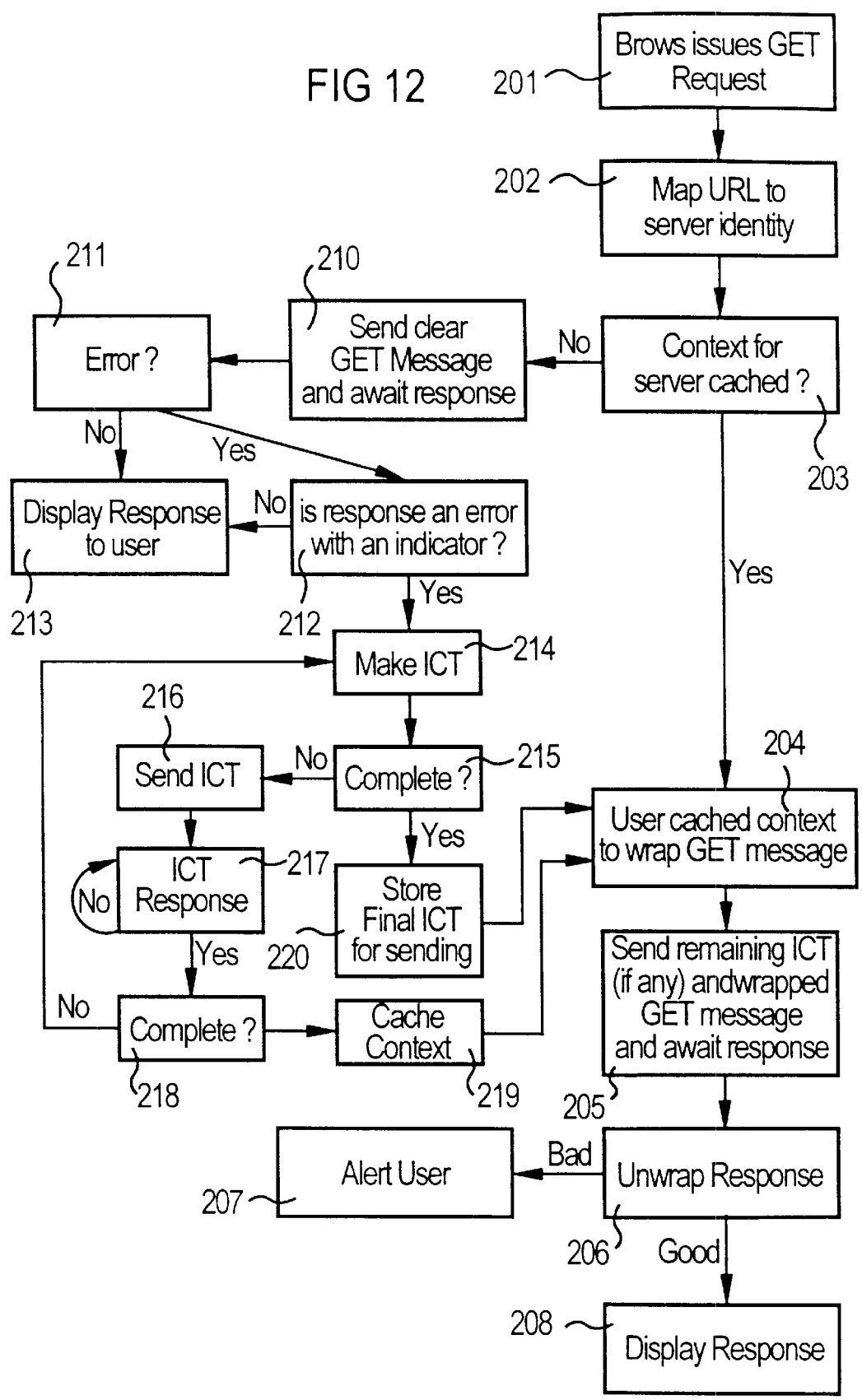

METHOD FOR GRANTING ACCESSES TO INFORMATION IN A DISTRIBUTED COMPUTER SYSTEM

BACKGROUND OF THE INVENTION

1. Field of the Invention

The present invention is directed to a method for granting accesses to information in a distributed computer system.

2. Description of the Related Art

The currently most important distributed computer systems are the Internet and—for business concerns—Intranets. The network security is a critical factor for the success of these systems in these systems.

Computer networks are terminals, controllers, periphery devices and processors and their connections to one another. Such configurations are defined as logical units that have a relationship to physical units of a network and specify the rules for interaction between these logical units. The components of a network are disclosed for example in European Patent Document EP 0 362 105 B1, columns 1 and 2. Many other network systems that, depending on their configuration and their employment, are generally operated as local or super-local networks, what are referred to as Local Area Networks or, respectively, Wide Area Networks, these being described corresponding to the network in European Patent Document EP 0 362 105 B1. All of these networks can be connected to one another by employing standardized protocols. The connection of a plurality of such systems is called a distributed computer system. What is referred to as the World Wide Web (WWW) is a permanent representative of such a computer system.

A few transfer protocols have become established for communication of the computer systems to one another as well as within these computer systems. An important transfer protocol is the TCP/IP (Transmission Control Protocol/Internet Protocol).

Within the networks, some computers work as what are referred to as servers that can be addressed by the actual users, which are referred to as the clients. The servers can offer different computing resources, documents, programs, etc. In particular, the servers make what are referred to as hypertext documents available to the clients. Hypertext documents are generated with what is referred to as a "Hypertext Markup Language" (HTML). HTML is a language that generates documents that can be displayed at the client independent of the platform. HTML is an application of the ISO Standard 8879: 1986 Information Processing Text and Office Systems; Standard Generalized Markup Language (SGML). SGML documents are sequence of characters that are physically organized as a set of entities and are logically organized in a hierarchy of elements. A SGML document contains data in the form of characters and what are referred to as "Markups". These markups describe the structure of the information and reproduce an example of this structure.

In addition to texts, graphics, video and the like, hypertext documents often contain references, what are referred to as links, to other hypertext documents. These links are commands in which instructions are embedded that make it possible for the system of the client to search for the target document. The target document can be allocated to a different server that can be located in a different network that is a component of the distributed computer system. When the HTML standard is employed for the hypertext document, then the link contains what is referred to as a Uniform Resource Locator (URL) that indicates the actual name of a document and the server system from which the document can be accessed.

The HTML pages are transmitted between the server and the client with a specific transfer protocol. An example of such a protocol is the Hypertext Transfer Protocol HTTP that is specified in the Internet Request for Comments 1945 (RFC1945). Such a protocol contains messages that are to be interpreted either as a request of a document or are interpreted as a reply to such a request. Requests and replies can be classified dependent on their content. For example, the HTTP protocol defines two requests types: what is referred to as a GET request that merely contains the requested URL and, thus, the sought document and the server system thereof, and a POST Request that also contains data added by the client in addition to the URL.

The client computers, with which hypertext documents can be displayed and processed, have a corresponding application program available to them, that is referred to as a browser. The browser can be available by itself or embedded in another application program on the client computer. This browser reproduces the contents of the hypertext document, potentially upon involvement of further application programs, at the client in the form of texts, images, sounds, and video sequences. In addition, a browser allows the links contained in the hypertext document to be followed. This branching to the links ensues from the point of view of the user—by a simple click with a computer mouse or with some other pointer instrument on a correspondingly marked location in the displayed hypertext document.

The hypertext documents are offered by servers. To that end, the servers directly access a document or generate it dynamically. In the dynamic generation, the servers employ application programs that, similar to a client, in turn implement a data exchange with a data bank on the basis of network protocol. The data read from the data bank are edited as a hypertext document and sent to the client.

Hypertext documents can contain fields that are to be filled in by the client. The filled-in fields supply the server with the required information. For example, a hypertext document looks like a form that the user is supposed to fill out. This form is sent from the client to the server, whereat the received information are processed in an application program. The application program can thereby run directly on the server or in a further data processing means outside the server. Given employment of this functionality, it is possible to make only the browser available at a client computer. The hypertext document then serves as a user interface for an application program. This application program then no longer has to be installed at the client; rather, it suffices to offer this user program at the server and to access this with a hypertext document and a standard browser.

What are referred to as proxy servers represent a special group of servers. These proxy servers merely forward the requests and replies that reach them to their destination location. Moreover, the proxy servers are in the position to intermediately store a few replies in a cache memory. This is particularly expedient given replies that contain hypertext documents that are frequently requested. This functionality reduces the network bandwidth that is required, since the quantity of data to be transmitted is reduced. A further important job of the proxy servers is the implementation of security routines. Proxy servers are utilized for handling incoming messages in security-oriented terms in that, for example, they encode these messages.

A few security demands arose when hypertext documents and hypertext user interfaces of applications were made available via distributed networks. These demands relate, first, to the security in the data transmission and, second, to the access to individual documents or groups of documents. Various encryption methods with which the transmitted data are made difficult to read or completely illegible for third parties are made use of with respect to the data transmission. Given an access protection to documents, an access is allowed or rejected in a user-specific fashion.

A general access protection is described, for example, in Internet Request for Comments 1508 (RFC1508) for what is referred to as the Generic Security Services Application Program Interface (GSS-API). A user/client communicates data to the server that document his identify. This ensues, for example, via an exchange of passwords or by employing specific cryptographic methods. When the identity of the client has been determined, the result can be deposited in a list and can be utilized for following access decisions.

A method for the exchange of passwords according to the hypertext transfer protocol HTTP is described in Internet Request For Comments 1945 (RFC1945). A cryptographic method for data security is described in the Secure Socket Layer Protocol (the SSL protocol, Version 3.0 Internet Draft, March 1996). An asymmetrical method, that is referred to as a Public Key Method (RSA), is proposed for mutual authentification between the server and the client.

The known methods exhibit the disadvantages listed below:

1. Problems governing situations wherein a plurality of clients whose access wishes must be controlled wish to access a plurality of servers. One reason for this is the administration outlay that must be exerted when the decision about granting an access is based on the specific right of a client. This type of assignment of rights means that each data source (for example, a server) must possess an access control list in which all clients having access rights must be contained. Such lists are extremely extensive and difficult to maintain so that they always have a current status. It therefore frequently occurs that clients whose access rights have already lapsed still have access to protected data because some time passes since the access control list has been updated.
2. The assigning of rights typically ensues by the administrator of the server. Often, however, it would be better to transfer this task to a security administrator or to leave this task in the hands of the owner of the data.
3. The servers always confirm the existence of a hypertext document, even when access thereto is subject to access control and is not granted. This confirmation can already inherently denote the publication of security-relevant information.
4. The access decision is made exclusively on the basis of the identity of the client.
5. The identity of the client is always disclosed to the server. In some instances, this approach harbors an infraction of the rules with respect to data protection since the administrator of the server can determine which client has access to which document.
6. As described above, many hypertext documents are dynamically generated at the server. To that end, the server accesses a different system via the network protocol, the actual content of the document being stored at this different system. In these cases, currently employed security methods cannot guarantee a secured connection between the server and the data base in the background which applies the security methods that are based on the security attributes of the actual client browser.
7. Frequently, the actual content of documents must be modified in order to assure reliable access to them. For example, the SSL method requires that the URL of a document exhibits a specific type.

The prior art has disclosed solutions for a few of these problems in conjunction with specific security application programs. In its technical report ECMA TR/46, for example, the European Computer Manufacturers Association (ECMA) has defined a security architecture whose access control is based on attributes that are assigned to the client.

A specific embodiment of this method was developed under the name SESAME (Security Europeans Systems for Applications in a Multivendor Environment). SESAME is defined in the corresponding standard ECMA 235.

A standard method for the integration of security functionality into an application program was defined in the RFC 1508 in conjunction with RFC 2048. The definition of what is referred to as an Application Program Interface (API) is contained therein, this being known as what is referred to as a Generic Security Services API (GSS-API).

SUMMARY OF THE INVENTION

The present invention is based on the object of providing a system for granting accesses to information in a distributed computer system that assures a simple access control that is always up-to-date in a largely anonymous form.

This and other objects and advantages of the invention are achieved by a system and method for granting accesses to information in a distributed computer system, including coupling a plurality of data processing devices to one another in inter-network fashion with transfer protocols; providing selective access to data packets independently of location at which the data packets are stored; protecting the data packets against random access by allocation of the data packets to a security class for which properties of an accessing party are defined; and enabling access to the data packets given a request by an accessing party having a corresponding security class as a requested data packet.

In a preferred embodiment, the invention provides allocating the data packets to at least three security classes, the at least three security classes including: a first security class which grants unrestricted access to a data packet and a second security class and a third security class which grant conditional access to a data packet; and further defining a plurality of properties that are allocated to the data packets in data-packet-specific fashion; checking presence of the properties allocated to a data packet before enabling access to the data packet; and requesting an accessing party to communicate the accessing party's properties when the properties of the accessing party are unknown for data packets of the second security class.

The invention provides for temporarily storing the properties of an accessing party in one of the data processing devices. Communicating from the accessing party a reference to a location of the one of the data processing devices at which the properties of the accessing party is deposited is performed in a preferred embodiment. The step of communicating uses a security protocol to communicate a reference to the access rights.

Handing over properties of an accessing party present at a data processing device to a following data processing device or to a program for generating a data packet is performed according to aspects of the invention.

The properties are defining for access to a data packet with reference to an access control list, the list including:
  a document field in which a name and location of a data packet are deposited;

a classification field in which the security class of the data packet is entered;

a privilege field in which the properties for accessing the data packet are entered; and an instruction field into which auxiliary information, if any, is entered.

As a variation, the present invention provides a method for granting accesses to information in a distributed computer system, whereby a plurality of data processing devices are coupled to one another in network-overlapping fashion with transfer protocols, and an access to data packets is selectively possible dependent on the location at which they are stored, including the steps of: communicating an access request to a data packet from a first data processing device to a second data processing device; checking by the second data processing device whether access stipulations are defined and, if not, making the data packet available and, given the presence of access stipulations, checking adherence thereto and sending an error message insofar as the properties of the first data processing device with respect thereto are unknown, a request to make the properties known being contained therein; communicating by the first data processing device its properties to the second data properties device that compares the received properties to the required properties on a basis of an access list and, when these are met, communicating the data packet to the first data processing device.

Further, veiling of the identity of the data packet which is to be accessed in that a name of the protocol employed is modified to that of a security protocol, a particular of the data processing device subsequently follows at which the requested data packet is available, and, subsequently, the location and name of the data packet is indicated at the data processing device in encrypted form, and a publication of the properties ensues by employing a security protocol in the data processing devices.

The network is the World Wide Web with data packets in the HTML format that are transmitted according to an HTTP protocol, according to one aspect of the invention. The data processing devices include personal computers and servers.

The step of enabling access to the data packets includes communicating the accessing party's properties. The step of communicating may use a security protocol to communicate the access rights. The handing over properties of an accessing party present at a data processing device to a program for generating a data packet.

The protection of data packets, particularly of hypertext documents, does not ensue by determining the identity of the accessing party but on the basis of properties of an accessing party. These properties have to be revealed only upon access to a protected document. The administrative outlay for the access control is extremely low since no accessor-specific lists wherein all the data packets to which an access is proper are listed need be maintained. It is always assured that the access authorization is current.

By introducing at least three protection classes, whereof a first protection class (open) grants unlimited access to a data packet and a second protection class (entry) and a third protection class (hidden) grant conditional access to a data packet, it can be made so difficult to locate data packets that the existence of data packets can also be veiled or kept completely secret. Any and all information about the presence of a data packet of the third protection class is thus suppressed, whereas the existence of the data packets of the second protection class is indicated. The outlay for a data exchange is minimized and, thus, the response time (which determines performance) is enhanced with a temporary, accessor-specific storing of its properties.

In the case of the World Wide Web, data packets are exchanged in the form of hypertext documents. These are divided into at least three categories. A distinction is thus made between hypertext documents having open access with the classification "open", hypertext documents with access control, that are referred to as "entry documents", and hidden hypertext documents, that are referred to as "hidden documents". After a corresponding request, which can ensue proceeding from any arbitrary data processing means which has the properties of a browser, a hypertext document having the classification "open" is communicated thereto. Hypertext documents having the classification "entry" and "hidden" can only be made available on browsers whose clients have been authenticated before the access. During the course of this authentification, privileges and, thus, access rights must have been defined that are adequate to allow an access to the requested hypertext document. When a request for access to a hypertext document with the classification "entry" or "hidden" comes from the browser of a client and the privileges that were defined by the authentification of the client do not suffice for access to the hypertext document, then the server denies the existence of the hypertext document. The client is informed of this denial by transmission of an error message in conformity with the transfer protocol being employed.

When the privileges of the client have not yet been determined within the framework of an authentification and the requested hypertext document is a document of the category "entry", the error message can also contain a reference thereto that the server administers some protected hypertext documents. The client's browser can use this indication as a trigger for the start of the authentification process.

The access to the hypertext documents is controlled by the classifications "open", "entry", or "hidden". Additionally, properties, which are referred to as privileges, must be deposited at the server and a browser client must document their possession in order to receive access to hypertext documents which are classified as "entry" or "hidden". In order to be able to document these privileges to the server as needed, these must be deposited at the browser client. When it is a matter of a set of privileges that is generally valid, these access rights must be at least temporarily stored at the browser client. The present invention thus meets the demands of the Secure Socket Layer SSL, in accord wherewith the access rights an be also be stored over a relatively long time. Alternatively thereto, the conditions of the ECMA SESAME project can also be met in the present invention and the access rights can be dynamically generated with the assistance of what is referred to as a Network Security Service.

When the access rights of a browser client have been registered in a reliable way at the server, then these access rights are intermediately stored at the server. This has the advantage that the access times to hypertext documents are shortened. This intermediate storing, however, makes it necessary that subsequent inquiries and replies are authenticated such that the server is sure to know which browser client is involved. Within the time span wherein the access rights of the browser clients are intermediately at the server, accordingly, it suffices that the browser client is authenticated at the server. Another transmission of the access rights can be foregone. This is of particular advantage since connections to specific servers always exist only for a short time during access to a specific hypertext document and are subsequently in turn interrupted. An encryption method in order to assure the data protection can be employed for these reoccurring access requests of the browser client and replies of the server.

According to one embodiment of the invention, the accessor, in particular the browser client, has the possibility of transmitting only a reference to his access rights to the server. The server can then access the referenced location and the received access rights of the current client. The referenced location can be another network interface or a local memory of the server.

According to a development of the invention, a security protocol is employed for the communication of the access rights or of a reference to the access rights. The transmission to the server ensues via what are referred to as Security Protocol Data Units PDU that are embedded within the transfer protocol employed for the access to the hypertext document.

According to a further development and embodiment of the invention, the server has a method available to it for forwarding access rights to following data processing devices and, thus, to server systems of the data bases. As a result thereof, it is possible to adapt the content of a requested hypertext document to the access rights of a browser client. This functionality is of particular advantage in those instances wherein the hypertext documents are employed as an interface for applications that sequence outside the browser client and that further-process data available to the browser client. The result of this further-processing is presented to the browser client as in a locally sequencing application program. The scope of the result is defined here by the deposited access rights. A repeated authentification between the browser client and the server and for every following server that must be accessed in the framework of the method is not required therefor.

A server can be employed to convert the access rights of a browser client into a specific transfer protocol that is processible by the following servers that do not contain the subject matter of the present invention. The interposed server that undertakes this conversion need not receive the requested hypertext document and thus serves as what is referred to as a proxy server. A plurality of servers that do not satisfy the security mechanisms of the present invention can be inserted into the security system via the proxy server with this functionality. The servers following the proxy can continue to be operated in an unmodified form. The hypertext documents or the programs employed for the generation of a document that are present on such an existing server can remain unmodified; nonetheless, access via the inventive security mechanism is enabled.

In a corresponding way, the browser client can also be preceded by a proxy that is employed for storing the access rights and transmitting them in a secure way. In this way, it is possible to employ the present invention at the browser client without having to modify the previously employed browser program. In such a case, the present invention offers access control, encryption and authentification between the proxy at the browser client side and the server that comprises the features of the present invention. When the server does not comprise these features, a corresponding proxy server having these features can be also precede it, so that previously existing browsers and servers can continue to be employed both at the client side as well as at the server side.

The introduction of the present invention can thus ensue without having to undertake modifications at the side of existing browsers, servers, hypertext document and corresponding programs.

BRIEF DESCRIPTION OF THE DRAWINGS

The invention is explained in greater detail below with reference to the drawing.

FIG. 7 is a schematic diagram of a browser module with security mechanisms;

FIG. 8 is a schematic diagram of a server without a security module and an additional proxy module with a security mechanism;

FIG. 9 is a schematic diagram of a browser without a security module and, additionally, of a proxy with a security module;

FIG. 10 is a visualization of a data exchange for the access to a hypertext document of the "entry" class;

FIG. 11 is a tabular illustration of different address forms and address component parts;

FIG. 12 is a flow chart for the access mechanism at the browser side;

DETAILED DESCRIPTION OF THE PREFERRED EMBODIMENTS

Figure 1:
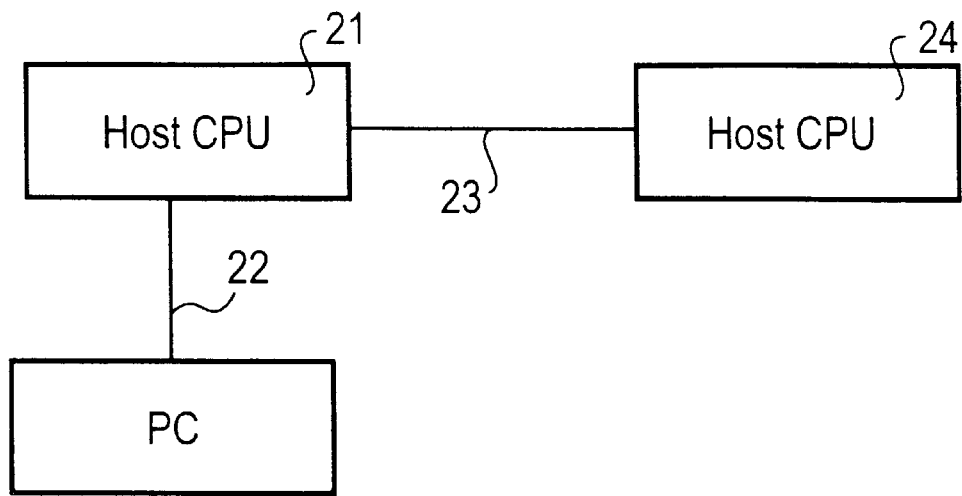
FIG. 1 is a schematic illustration of hardware components of a data processing network.

FIG. 1 shows a schematic illustration of a data processing network. This data processing network contains a personal computer PC or work station PC that is coupled to a host computer 21 via a network line 22. This host computer 21 is in turn coupled via a further network line 23 to at least one further host computer 24. The host computers 21 and 24 and the personal computer PC are component parts of a known network architecture.

Figure 2:
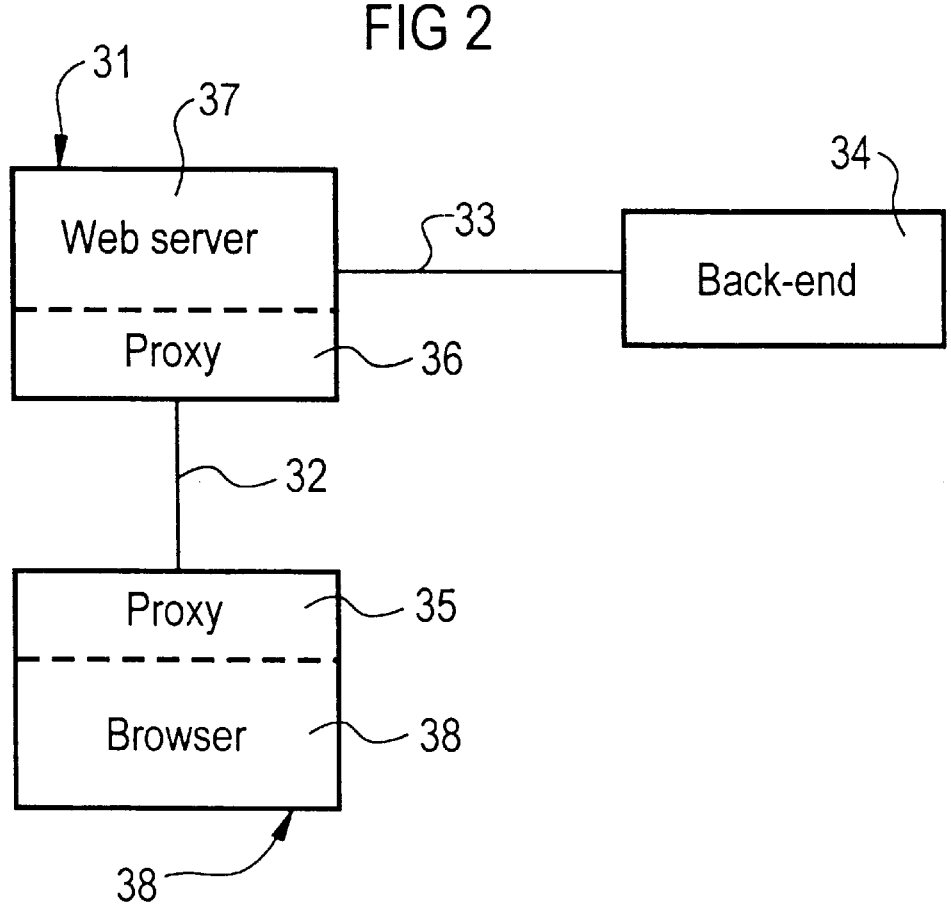
FIG. 2 is a block diagram of the critical software components of a data processing network of FIG. 1.

The exemplary embodiment employs this network architecture for the needs of a distributed computer system, particularly for what is referred to as the World Wide Web WWW. The software components of this WWW are shown in FIG. 2. A software program that is referred to as browser 30 and enables an access to hypertext documents (see FIG. 3) is loaded at the personal computer PC, which is referred to as the client. This browser 30 can also support the inventive security mechanisms. When it does not do this, a proxy 35 can be optionally available at the personal computer PC that meets these security demands. This proxy 35 then meets the inventive security demands. The network line 22 transmits data from the browser 30 to the host computer 21 via a transfer protocol 32. The hypertext transfer protocol HTTP is an example of such a transfer protocol 32. At the host computer 21, the transmitted data are accepted by a web server program 31, referred to below as a server 31. When this server 31 does not contain the required security mechanisms, a proxy program, referred to below as a proxy 31, can be inserted between the network line 22 and the server 31, this supporting the inventive security measures. Via the network line 23, the server 31 has access to network components running in the background. For example, the server 31 can access a data bank 34 via a specific transfer protocol 33. For accessing this data bank, the network protocol 33 can differ fundamentally from the network protocol 32. The network protocol 33 can be specifically adapted to the requirements of the data bank 34.

Figure 3:
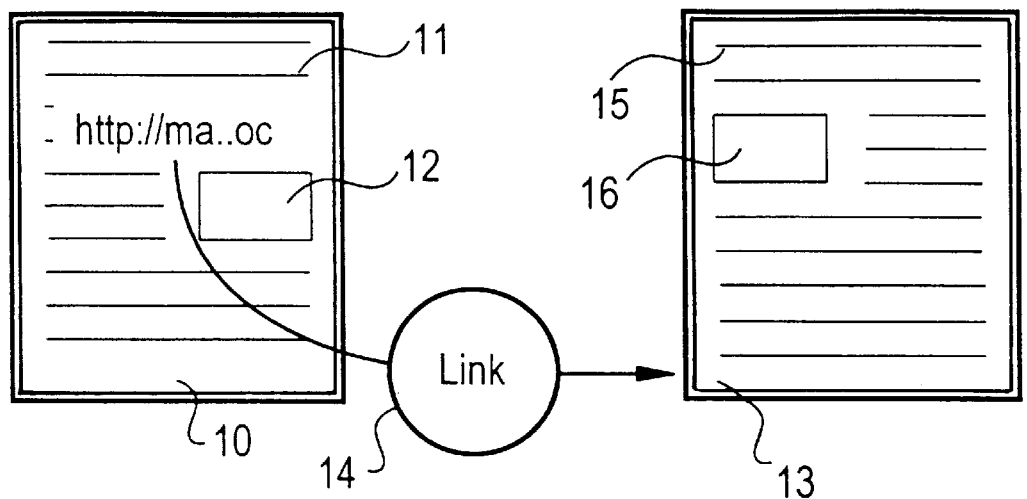
FIG. 3 is a schematic illustration of a link from one hypertext document to another.

A data exchange in the form of what are referred to as hypertext documents 10 ensues with the distributed computer system according to FIG. 1 and the software according to FIG. 2 distributed thereon. Such hypertext documents 10 are shown in FIG. 3. Such a hypertext document 10 contains data in the form of characters 11, images 12, videos (also referred to by reference character 12) or audio sequences and in the form of references 14, which are referred to as links, to further hypertext documents 13.

Figure 4:
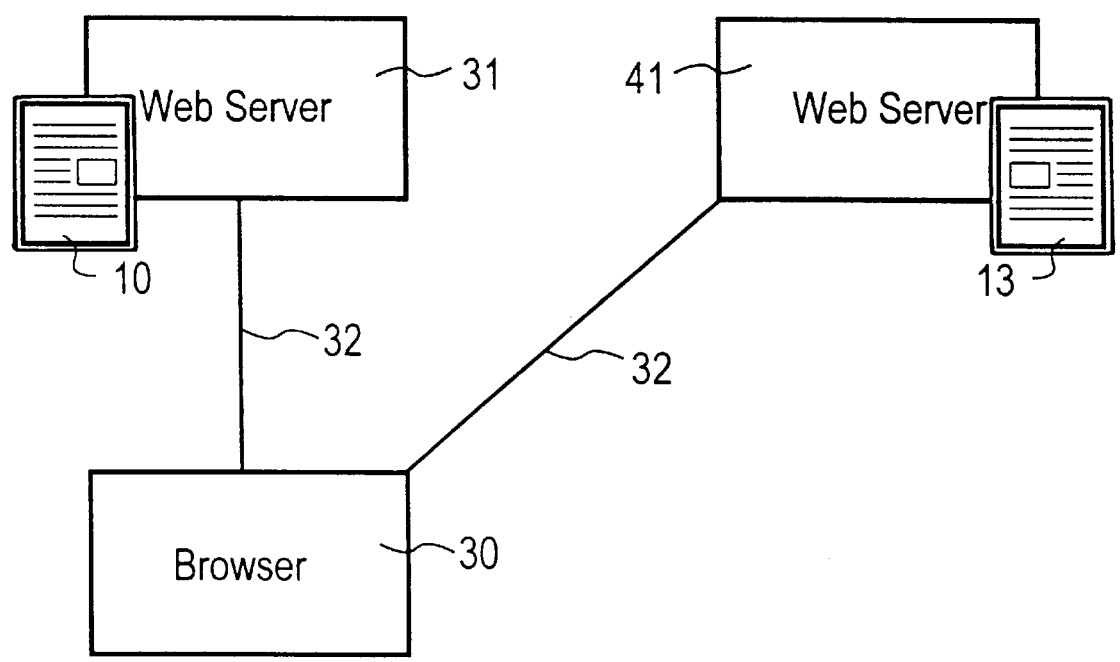
FIG. 4 is a schematic illustration of the conversion of a link according to FIG. 3.

As shown in FIG. 4, these hypertext documents 10 and 13 are allocated to different servers 31 and 41. The hypertext document 10 is allocated to the server 31, and the hypertext document 13 is allocated to the server 41. When the hypertext document 10 is called by the browser 30, this call is transmitted to the server 31 via the transfer protocol 32. The call contains the name of the server 31, the name of the hypertext document 10 and the location at which this hypertext document 10 is deposited at the server 31. This information is known as what is referred to as a Unique Resource Layer URL. The employed transfer protocol is also indicated in the URL, HTTP in this example. A complete URL, for example, reads HTTP://Host.sse.ie./documents/doc1. When this document has been found on the basis of the URL, it is packaged according to the rules of the transfer protocol HTTP that is employed and is communicated to the browser 30. The browser 30 is in the position to display this hypertext document 10 on the picture screen of the personal computer PC or to make it audible. The hypertext document 10 contains a link to the hypertext document 13. This link is a matter of a complete URL. On the basis of this URL, the browser 30 sends a request— packaged in a transfer protocol 32—to the server 41 that is named in the URL. On the basis of the information from the URL, the server 41 can find the hypertext document 13 and transmit it to the browser 30. The browser 30 can also display the hypertext document 13.

Figures 5, 6:
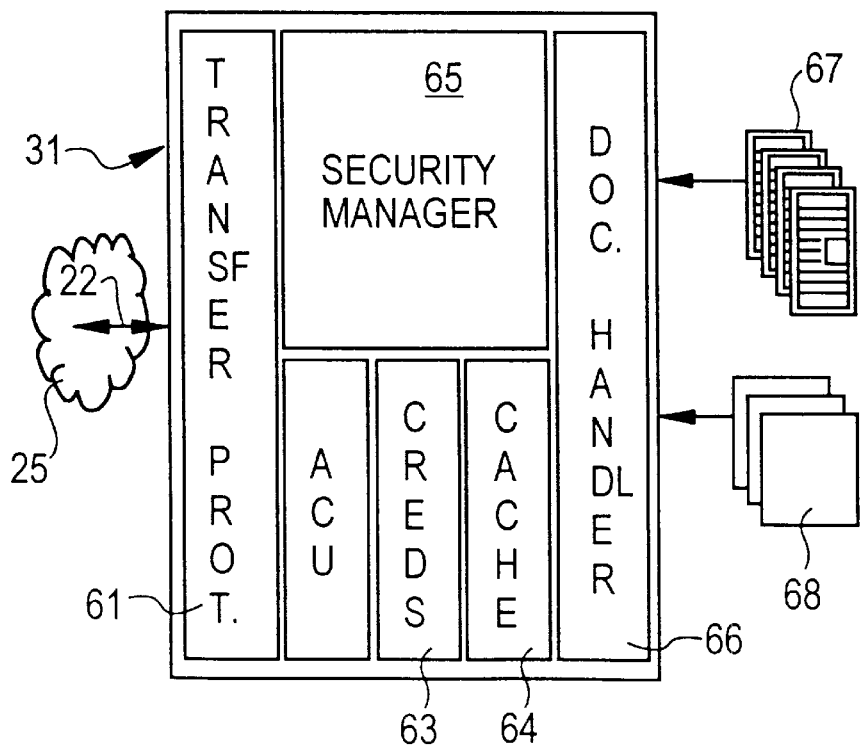
FIG. 5 is an example of an access control list.
FIG. 6 is a schematic diagram of a server module with security mechanisms.

An access to hypertext documents 10 and 13 can also be suppressed. Three categories of hypertext documents 10 and 13 are thereby to be distinguished: generally accessible documents, documents with limited accessibility and hidden documents. These categories are also referred to as "open", "entry" and "hidden". Every server 31 and 41 that administers documents classified in this way has an access control list ACL available to it. Such an access control list ACL is shown in FIG. 5. The access control list ACL contains document-specific statements about classification of the document, necessary privileges for accessing the document, and supplementary instructions for the implementation of the access to the hypertext documents 10 and 13. The document specification ensues by entry of the complete URL into the first column of a row. The classification of the document ensues into the three categories of "open", "entry" and "hidden". Such a classification can also be completely foregone. Role-dependent access mechanisms (privileges) can nonetheless be employed in such a system.

The privileges that are required for the access to the hypertext document are entered in the third column of a row. Access rights are divided into roles and graduations of the roles. Such roles are known from the standards ECMA 235 and ECMA TR/46, where they are obligatorily defined. Examples of roles are administrators, role:admin, openness of the document, clearance:topsecret or clearance:restricted, and clients. These individual roles can have different degrees of authorization, for example the degrees 1 through 6. It is also possible to define only an authentification as an access prerequisite. In this case, for example, the right ANY is entered in the third column.

The fourth column contains instructions that the server must carry out when the requested document cannot be simply read from a memory and sent. FIG. 5 shows two types of instructions: the instruction "program" contains the name of a program, for example "AdminP", that the server 31 must execute. Such a program then generates a hypertext document 10 or 13 and makes it available to the server 31. The server 31 can then send it to the browser client 30. The instruction "ad on" is employed to instruct the server to attach the command sequence, what is referred to as a "string", to the current request in HTTP format, this containing the access rights cited in the table with respect to the requested document 10 or 13. The request expanded in this way is forwarded to another server. A condition for this type of command execution is that the hypertext document is generated by a program or is to be obtained from another server via the HTTP protocol.

A decision as to whether an access to a document indicated in the first column of FIG. 5 is allowed is based exclusively on the document name indicated in this column. When the requested document name is not contained in this column and this document is available on the server, then it is fundamentally a matter of the document of the class "open".

FIG. 6 shows the functional component parts of a server 31 that contains the present invention. At the network side, the server contains a transfer protocol converter 61. This receives requests which are incoming via the network 25 and the network lines 22. These requests meet the condition of the network protocol TCP/IP and the HTTP format. The protocol converter 61 is in the position, on the basis of its "parser functionality", to convert incoming requests into such a form that they can be further processed in the server. It is likewise in the position to convert replies proceeding from the server according to the demands of the network 25 into a form transmittable thereat, according to the transfer protocol employed. A further component of the server is the access control unit ACU. This unit ACU has an algorithm available to it that accesses the access control list ACL according to FIG. 5 on the basis of the designation of a hypertext document 10 or 13. On the basis of the decision criteria contained in the algorithm, the access control unit ACU is placed into the position of making a decision about a right to access to this hypertext document 10 or 13. The access control unit ACU is also in the position to output other information contained in the decision table ACL, particularly those of columns 3 and 4.

The privilege generator 63 is a further server component. This unit 63 is in the position to determine the access rights of a requesting party. Further, it is responsible for the protection of the requests and replies. It thereby employs a security context. For example, the GSS-API as described in RFC 1508 is such a privilege generator. The access rights are temporarily generated for a current access from a browser client 30 onto a server 31 or 41 by the privilege generator 63.

The intermediate memory 64 is a further unit of the server 31 or 41. Access rights generated in the privilege generator 63 are temporarily stored therein. Likewise, the security context to be potentially employed is temporarily deposited in this intermediate memory 64. The memory duration in the intermediate memory 64 can be limited to a current access but can also amount to several hours or days. The memory duration can be freely defined.

The three components "the access control unit ACU", "the privilege generator 63" and "the intermediate memory 64" are controlled by the security control unit 65. This unit 65 contains a status machine that enables or inhibits an actual access to a hypertext document 10 or 13. In order to be able to convert this decision, it corresponds with units ACU, 63 and 64.

The server 31 or 41 contains a further component 66. This document access unit 66 is in the position to access the requested hypertext documents 10 or 13 in a document memory 67. When it is a matter of a hypertext document 10 or 13 that must be first generated by a program execution, then the document access unit 66 is in the position to start external programs 68 that generate the requested hypertext document 10 or 13. The document access unit 66 corresponds to this end with the program execution unit 68 via a generally employed interface such as, for example, the Common Gateway Interface (CGI) or via a specific interface. When the requested hypertext document 10 or 13 is present, the document access unit 66 hands this over to the security control unit 65.

The components that are available on the browser client side 30 are shown in FIG. 7. The browser 30 contains a user interface 72 that hands the hypertext documents 10 or 13 over for display on the personal computer PC. To that end, the user interface 72 converts the format of the hypertext document 10 or 13 such that it can be reproduced by the monitor or sound card function unit. The other components of the browser 30 correspond in terms of their functionality to the corresponding units 63, 64, 65 and 61 of the server. The privilege generator 73 generates the available access rights and offers the corresponding mechanisms of the security context required for the protection of the requests to be transmitted and of the received replies. Just as in the case of the server 31 or 41, these mechanisms are defined, for example, by the standard GSS-API according to RFC 1508.

The access rights and security context that are received are temporarily deposited in the intermediate memory 74. These two units 73, 74 are coordinated by the security control unit 75 of the browser side that forwards the corresponding information in the direction of the network. A protocol converter 71 is arranged between the network 25 and the security control unit 75, the browser functionality thereof converting the information according to the network protocol employed and according to the form of the presentation of the information employed in the browser 30.

Servers 31 and 41 are already in user that do not contain the components according to FIG. 6. In order to be able to continue to employ such servers 31 and 41, a proxy server 36 according to FIG. 8 can be inserted between the network 25 and the server 31. Such a proxy server 36 is largely identical to a server as shown in FIG. 6. However, hypertext documents 10 and 13 are not permanently stored in the proxy server 36. A storing of the documents only ensues by way of exception for frequently requested documents 10 and 13. At the network side, the proxy server 36 contains the protocol converter 61 by which requests and replies are converted. A security control unit 85 at the proxy server side corresponds with the access control unit ACU, the privileged generator 63 and the intermediate memory 64 in order to decide whether it should forward a request for a hypertext document 10 or 13 to the servers 31 and 41 or not. When the hypertext document 10 or 13 is not stored at the server 31 but must be dynamically generated, then this procedure is to be initiated proceeding from the proxy server 36. To that end, the security control unit 85 contains a corresponding interface 86. It is assured in this way that the program execution unit 68 coupled via the interface 86 can receive the required access information.

The coupling of the server 31 to the proxy server 36 ensues via a second protocol converter 87 of the proxy server 36. This protocol converter 87 converts the data according to the network protocol of a security network 89. The security network 89 connects the server 31 to the proxy server 36. The security-relevant data are transmitted in a protected form on the security network 89 as known, for example, from the standard GSS_API.

Browsers 38 which are already being employed can continue to be employed at the browser side as well. The browsers 38 which are already utilized are composed of the user interface 72 and of a protocol converter 94. Requests proceed from the protocol converter 94 to a proxy browser 35 via a network protocol 92 of a security network 93. This proxy browser 35 contains a further protocol converter 91 that converts the requests from the security network 93 for the proxy browser 35 and converts the replies from the proxy browser 35 for the security network 93. The other components 73, 74, 71 and 75 of the proxy browser 35 are identical to those of the browser 30 of FIG. 7.

The data exchange between the browser 30 and the server 31 is shown in FIG. 10 with reference to the example of an access to a hypertext document 10 or 13 of the class "entry". The browser 30 sends a request GET of a hypertext document 10 or 13 to the server 31. The browser 30 thereby does not know that this is a protected hypertext document 10 or 13 of the class "entry". It therefore sends a hypertext transfer protocol HTTP-defined GET request. At the server 31 side, the security control unit 65 and 85 determines on the basis of the access control ACU that it is a matter of a protected hypertext document 10 or 13. In response thereto, an error message 101 is generated and sent to the browser 30. This error message 101 contains a reference that the desired document exists but that access thereto is not free. This error message 101 can only be interpreted as an actual error message by a standard browser 38 that provides no further information about the existence and availability of the desired hypertext document. Correspondingly, an error message is output on the personal computer PC with the assistance of the standard browser 38. Given a browser 30 of the invention or given a standard browser 38 that is preceded by a proxy browser 35, the auxiliary information that indicates the existence of the document is recognized and interpreted such that a further request is sent to the server 31. This further request is packaged in a special form by the browser 30 and is enhanced with additional information.

As shown in FIG. 11, the original Unique Resource Locator URL begins with the specification of the network protocol to which this request refers. In the exemplary case, this is the HTTP protocol this is followed by the domain of the server, the name and the address of the server 31 address, and, potentially, the TCP port number, for example, 8080. This TCP port number is handled just like the domain of the server. Finally, the path and the document name of the sought hypertext document 10 or 13 is indicated in the last part of the URL. From this URL, the browser 30 extracts the domain, as indicated in line DNS in FIG. 11. DNS is a designation of an external address service performer, in this case of the "Internet Domain Name Services". The received DNS "Host.sse.ie" is abbreviated by the components located at the left edge. The remainder yields what is referred to as the SESAME domain, "SSE.IE". The principle name within this SESAME domain reads "websec.Host.sse.ie". The SESAME domain can be correspondingly interpreted by the server 31. The protocol particular "websec" is utilized thereto. A complete principle name, as shown in FIG. 11, last line, is formed from this principle name. To that end, the path designation "/SSE.IE@SSE.IE", for example, is appended to the principle name. The access rights of the browser client 30 and a protected copy of the actual HTTP get the request for the desired hypertext document 10 or 13 are contained in this path name. This complete principle name is transmitted as a request 102 from the browser 30 to the server 31.

The security control unit 65 and 85 of the server 31 extracts both the name and location of the requested hypertext document 10 or 13 as well as the access rights of the browser client 30 which are co-supplied by the browser 30 from the data transmitted with the request 102. There are instances wherein a multiple data exchange between the browser 30 and the server 31 is required for the transmission of the complete request 102. An example thereof is described in the GSS_API mechanism.

When the access rights that were transmitted together with the request 102 to the server 31 are adequate, then an access to this hypertext document 10 or 13 ensues via the document access unit 66 or a corresponding program in the program execution unit 68 is accessed that in turn supplies the desired hypertext document 10 or 13 to the server 31. Correspondingly, an access ensues from a proxy server 36 onto the server 37 that returns the hypertext document 10 or 13 or that returns the corresponding result onto the program execution unit 68 via the security control unit 85.

The hypertext document 10 or 13 which is thus available to the server 31 or to the proxy server 36 is packaged in a protocol-conforming reply, that is potentially encrypted and returned to the browser 30. The latter processes the hypertext document 10 or 13 such that it is in turn displayed to the client on the client's personal computer PC. The method executions in the browser 30 are explained below with reference to the flow diagram according to FIG. 12.

In a first step 201, the browser 30 outputs a request in the form of a Get Request to the security control unit via the user interface 72. The requested hypertext document 10 or 13 belongs to a security class "open", "entry" or "hidden" that is not known at the browser side. Further security classes can also be defined in a nearly arbitrary number. The sole limitation for the number of security classes is the amount of processible classes given a reasonable administration outlay.

When a browser 38 of a traditional type is employed, the document request proceeds via the user interface 72, the protocol converter 94, the security network 93 and the protocol converter 91 at the proxy browser side to the security control unit 75. In any case, it is a security control unit 65 and 75 which undertakes a comparison in step 202 of the requested server domain that are with server domains known at the browser side and makes a decision with the step 203.

When the decision is positive, then a context is deposited in the intermediate memory 74. In this case, this context is employed for packaging the request. This packaging and unpackaging is known under the names of "wrapping" and "unwrapping" within the scope of the standard GSS_API. The GSS-WRAP and GSS-UNWRAP functions are utilized as follows in the invention: the security control unit 75 receives a Get Message in clear text, for example "Get URL1". A corresponding context is taken from the intermediate memory 74. This context is employed for packaging the information "Get URL1", the packaged message deriving therefrom. The packaging function GSS-WRAP is given the information, whereupon this function supplies the packaged message as a result. The packaged message is what is referred to as a Paqueoctet-String whose internal structure is unknown to the caller of the GSS-WRAP function. The packaged message is formatted as an HTTP Post message having the form "POST/Special Place < . . . >". The fourth step 204 has thus been ended.

In the fifth step 205, the HTTP Post Message is transmitted to the server 30. In response thereto, the server 30 determines from whom this message comes and seeks a suitable context for this browser client in its intermediate memory 64. When such a context is present, the server 30 unpacks the HTTP Post Message given the assistance of the GSS_UNWRAP function to which it hands over the identified context and the packaged message. This function supplies the clear text of the HTTP message "Get URL1" with which the requested hypertext document 10 or 13 is adequately identified. This unpackaging process can only be implemented by the addressed server 31. The processing of the request of the referenced hypertext document may be seen in the context of the description of FIGS. 13 and 14.

When the server-side processing has supplied a positive result, the requested hypertext document 10 or 13 is transmitted to the browser-side security control unit via the network 25 and the server-side and browser-side protocol converters 61 and 71. The supplied hypertext document is unpackaged in the above-described way with the step 206. The unpackaged hypertext document 10 or 13 is either a matter of an alarm message that informs the browser client 31 of the abortive access request or the matter of the hypertext document 10 or 13. The alarm message is displayed on the personal computer PC with the step 207, and the requested hypertext document 10 or 13 is displayed on the personal computer PC of the browser client 31 with the step 208.

When it is found in step 203 that no context for the server 31 is deposited in the intermediate memory, the browser client 30 sends an unprotected request to this server 31 with the step 210 and waits for an answer. This answer is subsequently reviewed in step 211 to see whether it is a matter of an error message. When this is not the case, the answer is displayed at the personal computer PC of the browser client 30 in a step 213. When, by contrast, it is a matter of an error message, a check is carried in a further step 212 to see whether the error message has a security-relevant indication attached to it, in accord wherewith this is a matter of a document of the "entry" class. When this is not the case, the error message is displayed on the personal computer PC in the step 213. When, however, such an indication is present, then a step 214 initiates a procedure for defining a context with respect to the requested server 31.

The method according to step 214 for producing what is referred to as an Initial Context Token ICT is a GSS-API concept that references data of a protocol that are exchanged between units with the intent that a security context is declared between the two locations.

More is stated about this in the introduction to the Internet Requester Comments 1508 (RFC 1508). This is thereby a matter of a multi-stage process at the end whereof the complete context for the requested server 31 is present and is deposited in the intermediate memory 74.

A first stage of the ICT is generated. An interrogation is made in step 215 to see whether the ICT has now been completely formed. When this is not the case, the previously formed ICT is sent to the requested server 31. This server 31 generates a reply ICT and sends this to the browser-side security control unit 75 (also see FIG. 14). With step 217, the browser-side security control unit 75 waits for an answer of the server 31. When this is present, this answer is processed and a determination is then made in a step 218 as to whether the Initial Context Token ICT is completely present. When this is the case, the steps 214, 215, 216, 217 and 218 are repeated. When the complete ICT is then ultimately present, the corresponding context is deposited in the intermediate memory 74 in the step 219. The completely present ICT is reported to the step 204 and transmitted. As a result thereof, the renewed transmission of the Get Message is initiated, access to a specific hypertext document 10 or 13 of the requested server 31 to be obtained therewith. The steps 204, 205, 206 and 207 or 208 are executed for this purpose.

Figure 13:
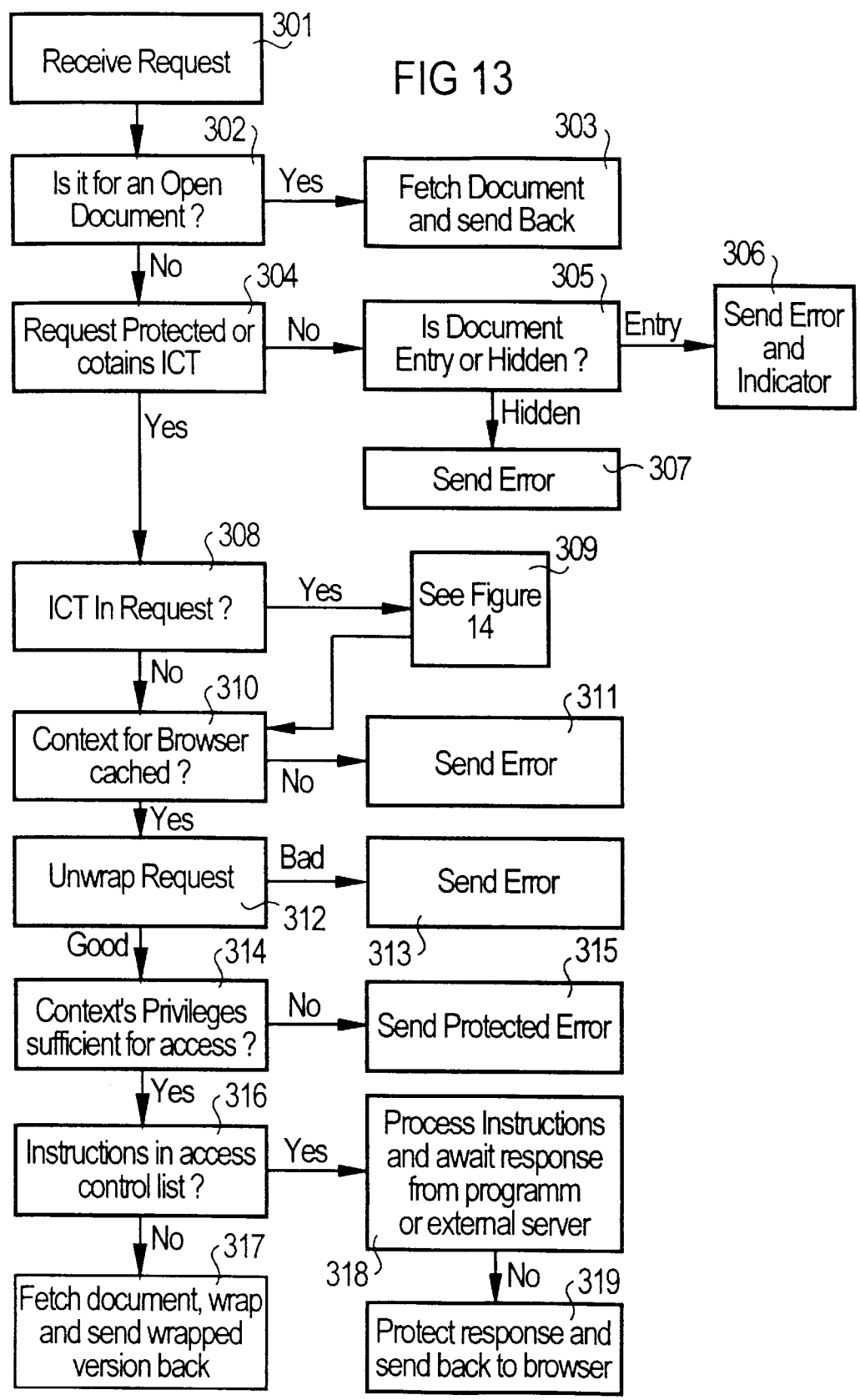
FIG. 13 is a flow chart of the access mechanism at the server side.

The server-side security strategy is explained on the basis of FIG. 13. In general, the executions described below occur in the server 31. When, however, the hypertext documents 10 and 13 are deposited in an ordinary server 37, then the described method executions ensue in the proxy server 36.

Via the network 25 and its protocol converter 61, the server 31 receives a Get Request. Upon reception of this Get Request, the security control unit 75 edits the Get Request such that it can decide on the basis of the access control unit ACU and the access control list ACL contained therein whether it is a matter of a hypertext document 10 or 13 of class "open". This question is answered with the step 302. When the answer is positive, the security control unit 65 requests the requested hypertext document 10 or 13 via the document access unit in the document memory 67 or in the program execution unit 68. When the documents are administered by a different server 37, a transmission of this document from the server 37 to the proxy server 37 is correspondingly initiated. The received hypertext document 10 or 13 is transmitted to the browser client 30 and reproduced thereat.

When it is not a matter of a document of the class "open", a check is carried out in a step 304 to see whether it is a matter of a protected request and to see whether it is a of a request that contains an Initial Context Token ICT. When neither of the two conditions applies, a check is carried out in a step 305 on the basis of the access control list ACL, which is being carried out by the access control unit ACU to see whether it is a matter of a hypertext document 10 or 13 of the class "entry" or "hidden". When it is a matter of a document 10 or 13 of the class "entry", a corresponding error message is sent to the browser 30 in a step 306, with an indication that it is an "entry" document. The browser 30 processes this in the way described with reference to FIG. 12. When it is a matter of a hypertext document 10, 13 of the class "hidden", then an error message is sent to the browser with a step 307. Whether this document exists or not cannot be derived from this error message.

When it is found in step 304 that it is a matter of a protected request and/or a request that contains an ICT, then, in a step 308, such requests are branched to a step 309 for further processing of the ICT.

Figure 14:
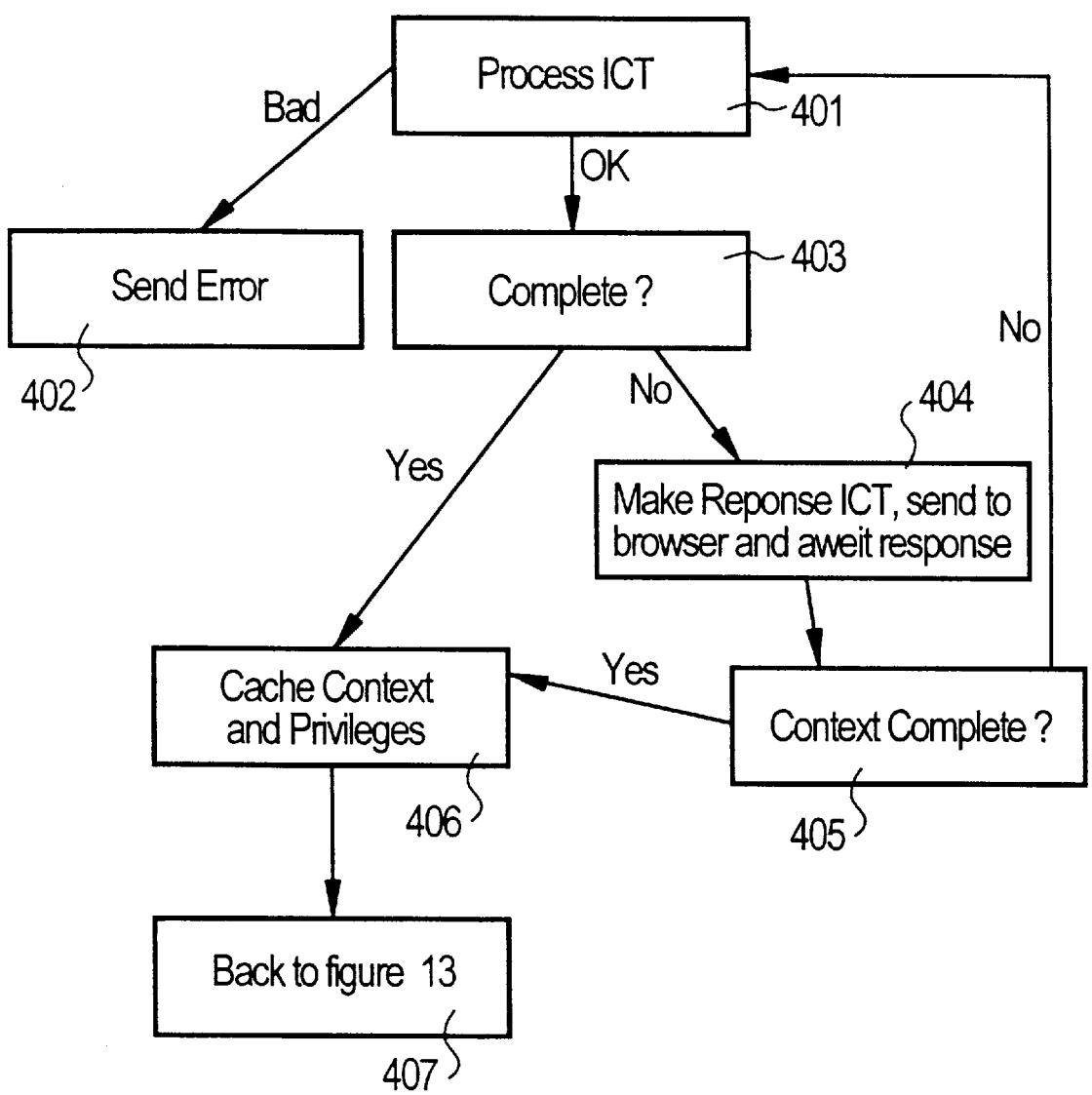
FIG. 14 is a detail of the flow chart of the access mechanism of the server side according to FIG. 12.

The steps 309 are now explained in greater detail with reference to FIG. 14. The ICT is processed in a first step 401. When it is found during the processing that it is a matter of a faulty ICT, a corresponding error message is sent to the browser 30 in a step 402 and the procedure is terminated. When the processing process of the ICT can be concluded in a regular fashion, a check is carried out in a step 403 to see whether the ICT is already completely present. When this is not the case, a corresponding request is sent to the browser 30 in a step 404 that, as described in greater detail in conjunction with FIG. 12, it applies to this request after processing it. When the complete context of the ICT does not derive from this reply, the steps 401 through 404 are repeated. When, however, the completeness of context is found with this step 405 or when the completeness thereof is identified in the following process steps 401 and 403, then the context and the identified access rights of the browser client 30 are deposited in the intermediate memory 64 with the step 406. After the end of this procedure, a branch is made with step 407 back to the step 309 of FIG. 13.

When this step 309 is ended or when it is found in the step 308 that no ICT is contained in the request, then a finding is made in a step 310 to see whether its context for the browser client 30 is contained in the intermediate memory 74. When this is not the case, an error message is sent to the browser client 30 with a step 311. When a context for the browser client 30 is present, the request is unpackaged in a step 312. When the request is not valid, a corresponding error message is sent to the browser client 30 in a step 313. When the request is valid, the access control unit ACU, given the assistance of the access control list ACL checks to see what access privileges must be present for accessing the hypertext document 10 or 13. The access control unit ACU compares these requests to the access rights of the browser client 30 deposited in the intermediate memory 64. When the deposited access rights are inadequate, an error message is generated in a step 315 and packaged on the basis of the context and transmitted protected to the browser client 30. When, however, the access control unit ACU finds in the step 314 that the access rights are adequate, the access control unit ACU checks in step 316 whether further instructions for access to the requested hypertext document 10 or 13 are contained in the fourth column in the access control list ACL. When this is not the case, the access control unit reports to the access control unit 85, whereupon this requests the hypertext document 10 or 13 in the step 317, packages it and sends it to the browser client 30.

When, however, further instructions are present in the access control list ACL, the corresponding instruction is read from the access control list ACL in a step 318 and is output to the security control unit 85, whereupon this initiates the implementation of the instructions. The security control unit 85 waits until the instructions are carried out and until it has the result, usually a hypertext document 10 or 13. In a step 319, the received hypertext document 10 or 13 is packaged and thus returned to the browser client 30 on a secured path.

Although other modifications and changes may be suggested by those skilled in the art, it is the intention of the inventor to embody within the patent warranted hereon all changes and modifications as reasonably and properly come within the scope of their contribution to the art.

We claim:

1. A method for granting accesses to information in a distributed computer system, comprising the steps of:

coupling a plurality of data processing devices to one another in inter-network fashion with transfer protocols;

providing selective access to data packets independently of location at which said data packets are stored;

protecting said data packets against random access by allocation of said data packets to a security class for which properties of an accessing party are defined;

enabling access to said data packets given a request by an accessing party having a corresponding security class as a requested data packet;

allocating said data packets to at least three security classes, said at least three security classes including:

a first security class which grants unrestricted access to a data packet and a second security class and a third security class which grant conditional access to a data packet;

defining a plurality of properties that are allocated to said data packets in data-packet-specific fashion;

checking presence of said properties allocated to a data packet before enabling access to said data packet; and requesting an accessing party to communicate the accessing party's properties when the properties of the accessing party are unknown for data packets of said second security class.

2. A method as claimed in claim 1, further comprising the step of:

temporarily storing the properties of an accessing party in one of said data processing devices.

3. A method as claimed in claim 2, further comprising the step of:

communicating from the accessing party a reference to a location of said one of said data processing devices at which the properties of the accessing party is deposited.

4. A method as claimed in claim 3, wherein said step of communicating uses a security protocol to communicate a reference to the access rights.

5. A method as claimed in claim 1, further comprising the step of:

handing over properties of an accessing party present at a data processing device to a following data processing device or to a program for generating a data packet.

6. A method as claimed in claim 1, further comprising the step of:

defining the properties for access to a data packet with reference to an access control list, said list including:
a document field in which a name and location of a data packet are deposited;
a classification field in which the security class of the data packet is entered;
a privilege field in which the properties for accessing the data packet are entered; and
an instruction field into which auxiliary information, if any, is entered.

7. A method as claimed in claim 1, wherein said network is the World Wide Web with data packets in the HTML format that are transmitted according to an HTTP protocol.

8. A method as claimed in claim 1, wherein said data processing devices include personal computers and servers.

9. A method as claimed in claim 1, wherein the step of enabling access to said data packets includes communicating the accessing party's properties.

10. A method as claimed in claim 9, wherein said step of communicating uses a security protocol to communicate the access rights.

11. A method as claimed in claim 1, further comprising the step of:

handing over properties of an accessing party present at a data processing device to a program for generating a data packet.

12. A method for granting accesses to information in a distributed computer system, whereby a plurality of data processing devices are coupled to one another in network-overlapping fashion with transfer protocols, and an access to data packets is selectively possible dependent on the location at which they are stored, comprising the steps of:

communicating an access request to a data packet from a first data processing device to a second data processing device;

checking by the second data processing device whether access stipulations are defined and, if not, making the data packet available and, given the presence of access stipulations, checking adherence thereto and sending an error message insofar as the properties of the first data processing device with respect thereto are unknown, said error message containing a request to make the properties of said first data processing device known;

veiling said error message as to an existence of the data packet; and communicating by the first data processing device the properties of the first data processing device to the second data properties device that compares the received properties to the required properties on a basis of an access list and, when these are met, communicating the data packet to the first data processing device.

13. A method as claimed in claim 12, further comprising the step of:

veiling identity of the data packet which is to be accessed in that a name of the protocol employed is modified to that of a security protocol, a particular of the data processing device subsequently follows at which the requested data packet is available, and, subsequently, the location and name of the data packet is indicated at the data processing device in encrypted form, and a publication of the properties ensues by employing a security protocol in the data processing devices.

14. A method as claimed in claim 12, wherein said data processing devices are personal computers and servers.

\* \* \* \* \*